(12) United States Patent
Xu et al.

(10) Patent No.: US 10,945,124 B2
(45) Date of Patent: *Mar. 9, 2021

(54) METHOD FOR ESTABLISHING AN INTERFACE AND COMMUNICATION BETWEEN A RELAY NODE AND A CORE NETWORK

(71) Applicant: Samsung Electronics Co., Ltd, Suwon-si (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,050

(22) Filed: May 29, 2018

(65) Prior Publication Data

US 2018/0279118 A1 Sep. 27, 2018

Related U.S. Application Data

(63) Continuation of application No. 14/373,618, filed as application No. PCT/KR2013/000402 on Jan. 18, 2013, now Pat. No. 10,009,757.

(30) Foreign Application Priority Data

Jan. 19, 2012 (CN) .................. 201210017985.X

(51) Int. Cl.
*H04W 8/26* (2009.01)
*H04B 7/155* (2006.01)
(Continued)

(52) U.S. Cl.
CPC ........... *H04W 8/26* (2013.01); *H04B 7/15507* (2013.01); *H04W 84/047* (2013.01); *H04W 92/045* (2013.01)

(58) Field of Classification Search
CPC .............................. H04W 92/045; H04W 8/26
See application file for complete search history.

(56) References Cited

U.S. PATENT DOCUMENTS 8,180,361 B2 * 5/2012 Surazski ............... H04W 76/12
455/453
2007/0213060 A1 9/2007 Shaheen
(Continued)

FOREIGN PATENT DOCUMENTS

CN 101867872 A 10/2010
CN 101964970 A 2/2011
(Continued)

OTHER PUBLICATIONS

Foreign Communications From a Related Counterpart Application, Chinese Application No. 201210017985.X, The Notification of the First Office Action dated Feb. 21, 2017, 11 pages.
(Continued)

*Primary Examiner* — Fahmida S Chowdhury

(57) ABSTRACT

The present invention provides a method for establishing an interface and communication between a relay node (RN) and a core network. The method may include: a base station sends an IP address of a control plane node of the core network to an RN; the RN initiates a process for establishing an interface with the control plane node corresponding to the IP address. Alternatively, the method may include: a base station sends an IP address and an identification of a control plane node of the core network to an RN; the base station sends an IP address and an identification of the RN to the control plane node of the core network; the RN and the node communicate with each other by using information of each other received from the base station. The method for establishing an interface and communication between an RN and a core network according to the present invention realizes transparent transmission of access layer signaling between a
(Continued)

relay node and a core network via a base station, which reduces complexity of the process when the RN is in movements, makes it easier to support multiple access techniques, and reduces the complexity in network configurations.

12 Claims, 9 Drawing Sheets

(51) Int. Cl.
*H04W 84/04* (2009.01)
*H04W 92/04* (2009.01)

(56) References Cited

U.S. PATENT DOCUMENTS

| | | | |
|---|---|---|---|
| 2009/0201878 A1 | 8/2009 | Kotecha et al. | |
| 2010/0046418 A1* | 2/2010 | Horn | H04W 40/22 370/315 |
| 2010/0046433 A1* | 2/2010 | Iwamura | H04W 92/045 370/328 |
| 2010/0103857 A1* | 4/2010 | Ulupinar | H04L 29/12207 370/313 |
| 2010/0103864 A1* | 4/2010 | Ulupinar | H04L 29/12207 370/315 |
| 2010/0103865 A1 | 4/2010 | Ulupinar et al. | |
| 2010/0202351 A1 | 8/2010 | Xi et al. | |
| 2011/0170517 A1* | 7/2011 | Bakker | H04W 36/0033 370/331 |
| 2011/0171953 A1* | 7/2011 | Faccin | H04W 48/08 455/426.1 |
| 2011/0208842 A1* | 8/2011 | Mildh | H04W 60/00 709/220 |
| 2011/0235505 A1* | 9/2011 | Eswara | H04L 43/10 370/221 |
| 2011/0244851 A1 | 10/2011 | Gunnarsson et al. | |
| 2011/0280217 A1* | 11/2011 | Drevon | H04W 48/18 370/331 |
| 2012/0071085 A1 | 3/2012 | Gunnarsson et al. | |
| 2012/0190335 A1 | 7/2012 | Dalsgaard et al. | |
| 2012/0315913 A1 | 12/2012 | Yang et al. | |
| 2012/0320817 A1 | 12/2012 | Xu et al. | |
| 2013/0021962 A1 | 1/2013 | Hu et al. | |
| 2013/0084884 A1 | 4/2013 | Teyeb et al. | |
| 2013/0090123 A1* | 4/2013 | Gunnarsson | H04B 7/15528 455/450 |
| 2013/0100815 A1* | 4/2013 | Kakadia | H04W 40/00 370/237 |
| 2013/0183971 A1 | 7/2013 | Tamaki et al. | |
| 2014/0051442 A1 | 2/2014 | Yang et al. | |
| 2015/0296424 A1 | 10/2015 | Xu et al. | |

FOREIGN PATENT DOCUMENTS

| | | |
|---|---|---|
| CN | 102118808 A | 7/2011 |
| WO | 2011124266 A1 | 10/2011 |

OTHER PUBLICATIONS

International Search Report dated Apr. 29, 2013 in connection with International Patent Application No. PCT/KR2013/000402, 3 pages.
Written Opinion of International Searching Authority dated Apr. 29, 2013 in connection with International Patent Application No. PCT/KR2013/000402, 7 pages.

* cited by examiner

METHOD FOR ESTABLISHING AN INTERFACE AND COMMUNICATION BETWEEN A RELAY NODE AND A CORE NETWORK

CROSS-REFERENCE TO RELATED APPLICATIONS AND CLAIM OF PRIORITY

This application is a continuation of U.S. patent application Ser. No. 14/373,618 filed on Jul. 21, 2014, which is a 371 of International Patent Application No. PCT/KR2013/000402 filed on Jan. 18, 2013, which claims priority to Chinese Patent Application No. 201210017985.X filed on Jan. 19, 2012, the disclosures of which are herein incorporated by reference in their entirety.

TECHNICAL FIELD

The present invention relates to mobile communications, and particularly, to a method for establishing an interface and communication between a relay node (RN) and a core network.

BACKGROUND

FIG. 1 is a schematic illustrating a conventional structure of an LTE system supporting RN. As shown in FIG. 1, in an access network of an LTE system, wireless resource management entities may include macro base stations (eNB) 101 and relay nodes (RN) 102. An RN accesses a core network via another type of macro base stations (DeNB) 103. The eNBs 101 are connected with each other via X2 interfaces. Each of the eNBs 101 are connected with mobility management entities (MME) and serving gateways (S-GW) 104 in the core network via S1 interfaces. The RNs 102 access the DeNBs 103 via Un interfaces. A DeNB 103 provides X2 proxy functions between RNs 102 and other eNBs. A DeNB 103 provides S1 proxy functions between RNs 102 and MME/S-GWs 104. S1 proxy function and X2 proxy functions include transmission of UE-dedicated X2 signaling and S1 signaling between an RN 102 and an eNB 101 and between an RN 102 and an MME 104, and transmission between an RN 102 and an S-GW 104.

FIG. 2 is a schematic illustrating a conventional protocol stack of an S1 interface on a control plane supporting relay. There is an S1 interface between an RN and a DeNB of the RN, and there is an S1 interface between a DeNB and each MME in an MME pool. A DeNB processes and forwards all UE-dedicated A1 signaling between an RN and an MME. The processing of UE-dedicated S1 messages by a DeNB includes modifying S1-application protocol UE identifications (S1-AP UE IDs), transport layer addresses and GTP TEIDs, and keeping other parts of the messages unchanged.

Conventional relays are deployed at fixed locations, and do not support mobility across different cells. At present, a problem faced by operators is that in high-speed trains, e.g. a train traveling at a speed of 250-350 km/h, current relays cannot provide satisfactory service quality due to factors such as big noises, high penetration loss, severe Doppler frequency shifts, low handover success ratio, and so on. Operators thus start researches in mobile relays. Mobile relays are proposed to eliminate the deficiencies of conventional relays, to improve service quality provided in high-speed trains, and to serve users better. In the current system framework, a DeNB stores UE context information of UEs served by an RN. The DeNB needs to allocate UE S1 AP IDs, a TEID and a transport layer address for each of the UEs served by the RN. In a high-speed running train, there are a lot of users who are relatively static from the perspective of the train. When an RN moves from one DeNB to another DeNB, it is desirable to transfer context of a UE from the serving DeNB to the target DeNB and the target DeNB needs to allocate UE S1 AP IDs, a TEID and a transport layer address for the UE, which adds complexity to the moving process. In addition, a mobile RN is required to support multiple access techniques, e.g. 2G/3G/LTE, but the Un interface supports the LTE access technique only. A DeNB implements proxy functions according to the above framework of a fixed RN. If a UE accesses a 3G network, a DeNB is required to proxy an Iu message and to support an Iu protocol, which is complicated for a DeNB. An optimized RN framework may solve the above problems, e.g. the control plane merely transparently transports S2 signaling between an RN and an MME and signaling of other access techniques between an access network and a core network. Therefore, a DeNB does not have to store context information of a UE or allocate resources to the UE. During movements of an RN, if a UE is relatively static and the MME serving the UE is unchanged, the movements of the RN are transparent for the UE. A problem of the above framework exists in how to transparently transport S1 signaling between an RN and an MME via a DeNB because the DeNB cannot identify the destination node using information in an S1 message when the DeNB does not parse the S1 message. One solution to the problem is to interact via the transport layer about how to route an S1 message. The problem of the above manner of interacting via the transport layer about how to route an S1 message is how an MME or an RN is able to get knowledge about transport layer information and/or information of an access layer of each other.

The above takes an interface between a UE and an RN according to the LTE access technique as an example. The above problem still exists when a UE accesses other types of core networks by using other access techniques. For example, the problem of how to transport information of the transport layer and information of the access layer also exists in the process of establishing an interface and communication between an RN and an SGSN in a 3G network and between an RN and an MSC in a 2G network.

SUMMARY

Embodiments of the present invention provide a method for establishing an interface and communication between an RN and a core network to reduce unnecessary signaling procedures, to reduce complexity, to mitigate network congestions, to support multiple types of access techniques, and to reduce the complexity in configuration process in high-speed movements.

To attain the above objective, the technical scheme of the present invention is as follows.

A method for establishing an interface and communication between a relay node and a core network may include:

A, sending, by a base station, an IP address of a control plane node in a core network to a relay node (RN);

B, initiating, by the RN, a process of establishing an interface with the control plane node corresponding to the IP address received.

In an embodiment, when the RN receives an IP address for each of multiple control plane nodes in the core network respectively, the initiating by the RN a process of establishing an interface with the control plane node may include:

initiating a process of establishing an interface with each of the multiple control plane nodes respectively.

In an embodiment, the control plane node in the core network in step A may be: a core network control plane node connected with the base station; or a core network control plane node connected with the base station and supporting RN or mobile RN; or a core network control plane node connected with the base station and in a mobility management entity (MME) pool configured for a mobile RN.

In an embodiment, before step A, a core network control plane node may inform the base station of whether the core network control plane node supports mobile RN when the base station is establishing an interface with the core network control plane node.

In an embodiment, before step A, a control plane node in the core network may inform the base station of whether the control plane node is in a core network control plane node pool configured for a mobile RN.

In an embodiment, the informing by a control plane node in the core network the base station of whether the control plane node is in a core network control plane node pool configured for a mobile RN is performed when the base station is establishing an interface with the control plane node.

In an embodiment, the initiating by the RN a process of establishing an interface with the control plane node corresponding to the IP address received in step B may include: sending, by the RN, an interface establish request to the control plane node, wherein a protocol layer destination address in a message bearing the interface establish request includes the IP address received; sending, by the base station, the interface establish request to the control plane node corresponding to the IP address based on a destination IP address after receiving the interface establish request.

In an embodiment, the interface establish request may include any or any combination of an identification of the RN, a list of TAIs supported by the RN, a default cyclic non-consecutive receiving parameter.

In an embodiment, after step B, the method may further include:

sending, by the control plane node which has received the interface establish request, an interface establish response to the RN after step B, wherein a protocol layer destination address in a message bearing the interface establish response is set to be the IP address of the RN, the interface establish response comprises a list of identification and relative capacity of control plane nodes in the core network;

sending, by the base station, the interface establish response to the RN transparently.

In an embodiment, the RN may select a control plane node in the core network based on identifications of the control plane nodes for a UE accessing the RN, and executes NNSF functions; the RN may select a control plane node in the core network based on relative capacities of the control plane nodes for a UE performing initial access to the RN.

In an embodiment, in an LTE system, the control plane node in the core network may be a mobility management entity (MME), the base station may be a DeNB, and the interface establish process in step B may be an S1 interface establish process; and wherein the sending by the base station the IP address of the control plane node to the RN may comprise:

sending, by the DeNB, an IP address of a connectable MME in an RRC connection re-configuration message which is sent to the RN during an RN attach procedure; or sending, by the DeNB, an IP address of a connectable MME in an S1 establish response which is sent to the RN during an RN attach procedure.

In an embodiment, in a 2G system, the control plane node in the core network may be a mobile switching center (MSC), and the interface establish process in step B may be an Iu interface establish process.

In a 2G system, the control plane node in the core network may be a mobile switching center (MSC), and the interface establish process in step B may be an Iu interface establish process.

A method for establishing communication between a relay node (RN) and a core network may include:

A, sending, by a base station, information of a control plane node in a core network which comprises an IP address and an identification of the control plane node to a relay node (RN); sending, by the base station, an IP address and an identification of the RN to the control plane node in the core network;

B, performing, by the RN and the control plane node in the core network, communication by utilizing information of each other received from the base station.

In an embodiment, the information of the control plane node in the core network sent by the base station to the RN may further include a relative capacity of the control plane node in the core network.

In an embodiment, the information of the RN may further include a list of TAIs supported by the RN.

In an embodiment, the control plane node in the core network may be:

a core network control plane node to which the base station is connected; or a core network control plane node connected with the base station and supporting RN or mobile RN; or a core network control plane node which is connected with the base station and is in a core network control plane node pool configured for a mobile RN.

In an embodiment, before step A, a core network control plane node may inform the base station of whether the core network control plane node supports mobile RN when the base station is establishing an interface with the core network control plane node.

In an embodiment, before step A, a control plane node in the core network may inform the base station of whether the control plane node is in a core network control plane node pool configured for a mobile RN.

In an embodiment, the informing by a control plane node in the core network the base station of whether the control plane node is in a core network control plane node pool configured for a mobile RN is performed when the base station is establishing an interface with the control plane node.

In an embodiment, the RN may select a control plane node in the core network for a UE accessing the RN based on the identification of the control plane node in the received information of the control plane node, and executes NNSF functions.

In an embodiment, in an LTE system, the control plane node in the core network may be an MME, and the base station may be a DeNB.

In an embodiment, the sending by the base station the information of the control plane node to the RN may include:

sending, by the DeNB, information of a connectable MME in an RRC connection re-configuration message which is sent to the RN during an RN attach procedure;

wherein the sending by the base station the information of the RN to the available core network control plane node comprises: when the DeNB is establishing an connection with the RN, sending, by the DeNB, an S1 context establish response which includes the information of the RN to an MME serving the RN; or sending, by the DeNB, an eNB configuration update message which includes the information of the RN to a connectable MME which is not the MME serving the RN.

In an embodiment, the sending by the base station the information of the control plane node to the RN may include: sending, by a DeNB, an S1 establish response which includes information of a connectable MME to the RN during an RN attach procedure;
wherein the sending by the base station the information of the RN to the control plane node in the core network comprises: sending, by the DeNB, an eNB configuration update message which includes the information of the RN to each connectable MME.

In an embodiment, in a 2G system, the control plane node in the core network is a mobile switching center (MSC), and the interface establish process in step B is an Iu interface establish process.

In a 2G system, the control plane node in the core network may be a mobile switching center (MSC), and the interface establish process in step B may be an Iu interface establish process.

In view of the foregoing, the method according to the present invention implements transparent transmission of access layer signaling between a relay node and a core network via a base station, which reduces complexity of the process when the RN is in movements, makes it easier to support multiple access techniques, and reduces the complexity in network configurations.

DETAILED DESCRIPTION

Figure 1:
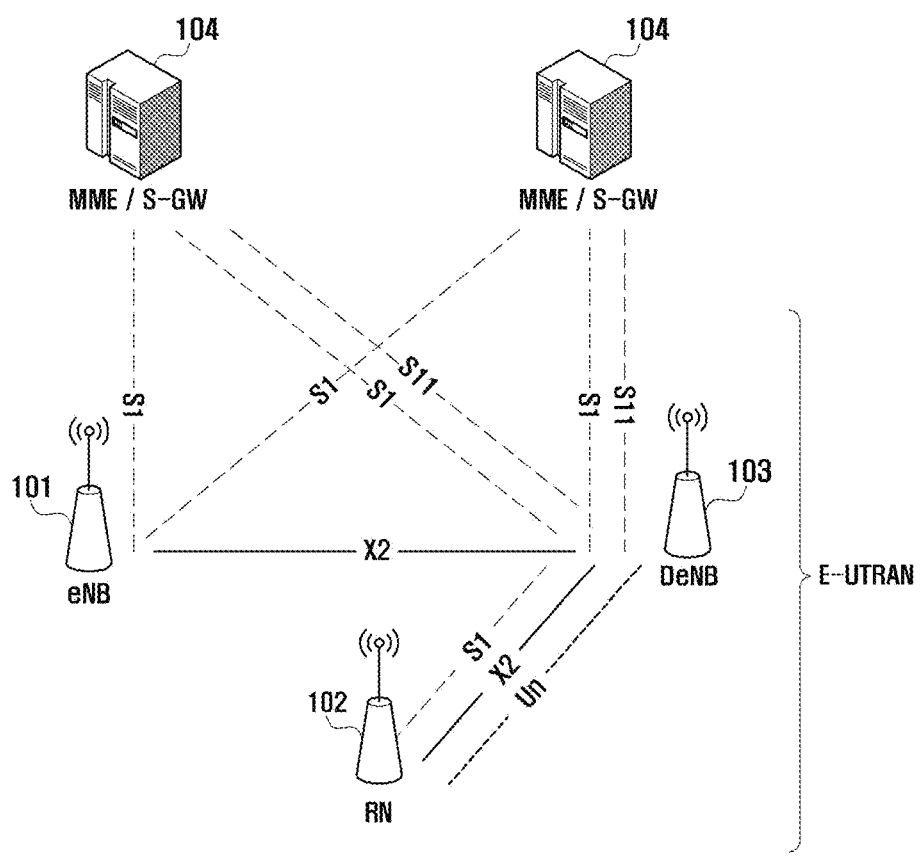
FIG. 1 is a schematic illustrating a structure of conventional LTE supporting RN.
Figure 2:
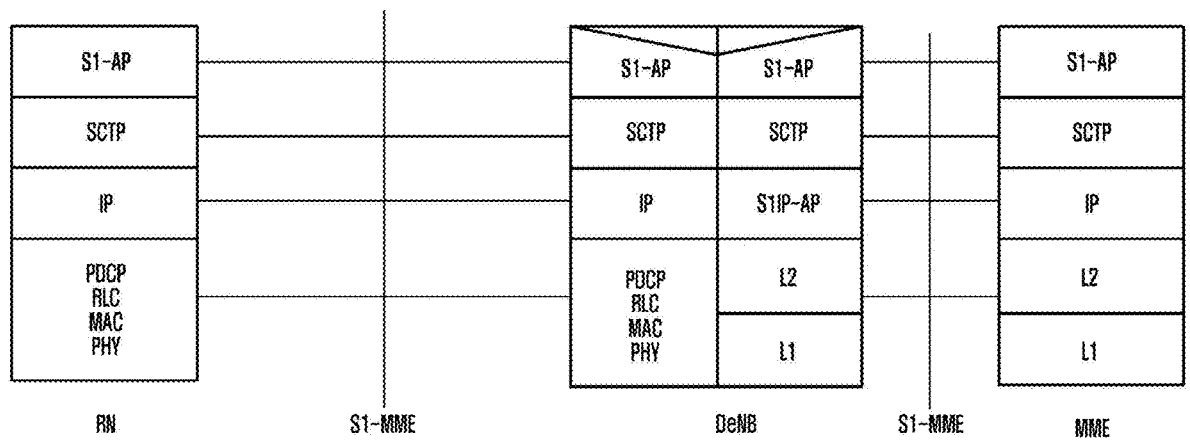
FIG. 2 is a schematic illustrating a conventional protocol stack of an S1 interface of a control plane supporting RN.

To solve at least one of the problems in the conventional art, embodiments of the present invention provide a method for establishing an interface and communication between an RN and a core network.

The present invention is hereinafter further described in detail with reference to the accompanying drawings as well as embodiments so as to make the objective, technical solution and merits thereof more apparent.

The method according to the present invention is about the manner of establishing an interface between an RN and a core network and the manner of an RN performing communication with the core network, i.e., the method is also applicable for establishing an Iu and communication between an RN and an SGSN or an MSC, and is not limited to S1 only.

Embodiments of the present invention mainly propose an RN and a control plane node in the core network (e.g. an MME in the LTE, an SGSN in 3G, an MSC in 2G) to obtain transport layer information of each other via a base station before an interface between them is established. Specifically, there are two ways of obtaining transport information of each other for establish an interface and communication according to the present invention.

In an embodiment, a base station sends transport layer information of a control plane node in a core network directly to an RN, and the RN triggers an interface establish process with the control plane node to establish an interface and perform communication after receiving the transport layer information.

In another embodiment, the base station sends transport layer information of each other to an RN and a control plane node in a core network, and the RN and the control plane node directly perform communication with each other by using the transport layer information received.

The above two manners are described thereinafter in detail. For simplicity and illustrative purposes, the following description takes a core network of an LTE system as an example, i.e. the control plane node in the core network is an MME, the interface established is an S1 interface. It can be understood that the following methods are also applicable for a core network of a 2G system and a core network of a 3G system where the MME should be replaced with MSC or SGSN, and the S1 interface between the RN and the core network should be replaced with an Iu interface, therefore, information of an SGSN in a 2G system or information of an MSC in a 3G system can be provided for the RN by a DeNB. A DeNB does not have to identify the type of the core network, and only has to send an IP address and an identification of a control plane node in the core network to the RN. Identifications of different core network control plane nodes may have the same number of digits, and there may be certain mapping relations. A few fixed bits may be used for identifying the type of the core network. Therefore, after receiving messages from different access systems via a radio interface, the RN may send a proper message to the control plane node in the core network corresponding to the received message.

Figure 3:
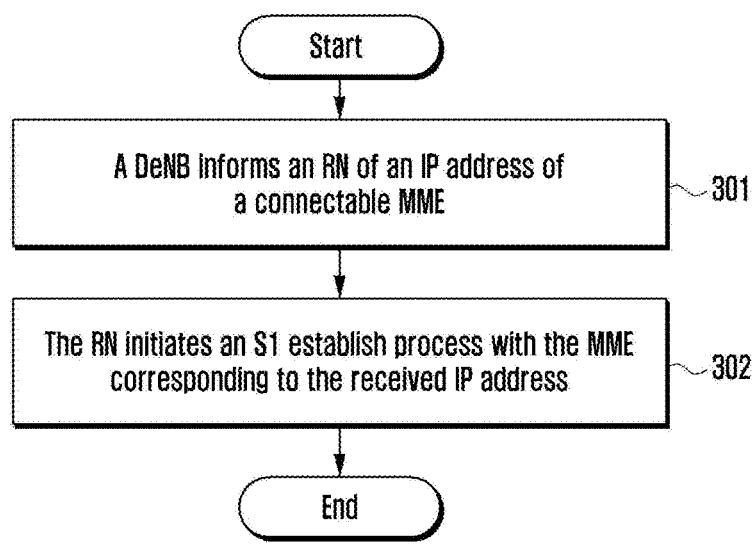
FIG. 3 is a flowchart illustrating a first method for establishing an interface and communication between an RN and a core network in accordance with an embodiment of the present invention.

FIG. 3 is a flowchart illustrating a first method for establishing an interface and communication between an RN and a core network in accordance with an embodiment of the present invention. Following is detailed description of FIG. 3.

In block 301, a DeNB informs an RN of an IP address of a connectable MME.

When informing the RN of the IP address of the connectable MME, the DeNB may inform the RN of the IP address of all MME connected with the DeNB, and the RN may establish an S1 interface and perform communication with each of the MMEs. This will add heavy load to the radio interface between the RN and the DeNB because messages between the RN and the MMEs need to be transparently transported by the DeNB.

In order to reduce the load of the radio interface between the RN and the DeNB, the connectable MME whose IP address is sent to the RN may be an MME connected with the DeNB and supporting RN or mobile RN, or an MME connected with the DeNB and in an MME pool configured for a mobile RN.

It should be noted that if the connectable MME whose IP address is sent to the RN is an MME connected with the DeNB and supporting RN or mobile RN, the MME needs to inform the DeNB of whether the MME supports RN or mobile RN before the procedure in this block. In an embodiment, an MME may inform the DeNB of whether the MME supports RN or mobile RN when the DeNB is establishing an S1 with the MME.

If the connectable MME whose IP address is sent to the RN is an MME connected with the DeNB and in an MME pool configured for a mobile RN, the MME needs to inform the DeNB of whether the MME is in the MME pool configured for a mobile RN before the procedure in this block. In an embodiment, an MME may inform the DeNB of whether the MME is in the MME pool via an S1 establish response sent when the DeNB is establishing an S1 with the MME or via other procedures.

In block 302, the RN initiates an S1 establish process with the MME corresponding to the IP address received in block 301. If the RN has received multiple IP addresses, the RN may initiates an S1 establish process with each of the MMES.

The S1 establish process initiated by the RN with the MME may include: the RN sends an S1 establish request to the MME. A destination address in a protocol layer of a message bearing the S1 message may include the IP address of the MME. After receiving the message, the DeNB forwards the S1 establish request to a target MME according to the destination IP address.

In an embodiment, the interface establish request may include any or any combination of an identification of the RN, a list of TAIs supported by the RN, a default cyclic non-consecutive receiving parameter. The list of TAIs supported by the RN and the default cyclic non-consecutive receiving parameter may be used for paging when mobile RN is supported, and the MME may sends the list of TAIs supported by the RN to a UE accessing the RN. Therefore, when the UE is relatively static against the RN, the UE does not have to initiate an uplink TAU process. The MME may page a UE by using the list of TAIs sent to the UE.

A target MME may store received information of an access layer of the RN, and may further store the IP address of the source end, i.e. the RN.

The MME may send an S1 establish response to the RN. The protocol layer destination address in a message bearing the S1 establish response may be set to the IP address of the RN to enable the DeNB to transparently transmit the message to the RN. The S1 establish response may include a list of MME identifications, a relative capacity of an MME, and information indicating whether an MME supports mobile RN. The RN may select an MME for a UE accessing the RN based on the MME identifications, and implements NNSF functions. For a UE performing initial access, the RN may select an MME for the UE based on the relative capacities of the MMES.

If the RN needs to send a UE S1 message to the MME subsequently, the RN may set the IP address of the MME in the protocol layer destination address of a message bearing the S1 message. After receiving the message, the DeNB forwards the S1 message to the MME according to the destination IP address.

If the MME needs to send a UE S1 message to a serving RN subsequently, the MME may set the protocol layer destination address in a message bearing the S1 message to be the IP address to enable the DeNB to transparently transmit the S1 message of the UE to the RN.

It should be noted that the protocol of the message bearing the S1 message may be stream control transmission protocol (SCTP) and IP.

The S1 signaling between the RN and the MME may be mapped to the user plane EPS bearer of the RN.

Hence, the process of a first method for establishing an interface and communication between an RN and a core network in accordance with an embodiment of the present invention is completed. Through the above scheme, the RN obtains the IP address of the MME via the DeNB, and initiates an S1 interface establish process with the MME. In an embodiment, during the S1 interface establish process, the RN sends access layer information of the RN to the MME, and the MME sends the identification and capacity information of the MME to the RN. Then, the RN may select an MME for a UE, and communicates with the MME. An S1 message between the RN and the MME is transparently transmitted by the base station.

Figure 4:
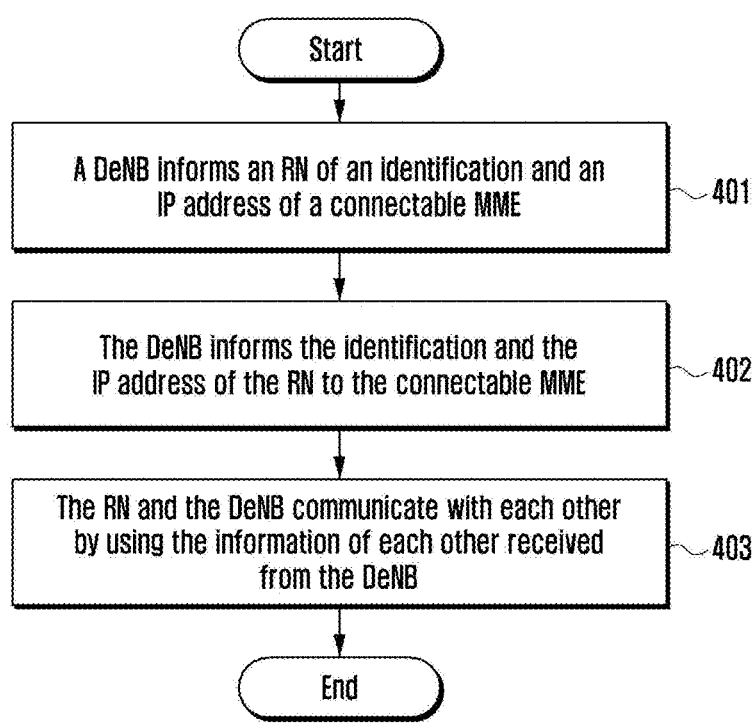
FIG. 4 is a flowchart illustrating a second method for establishing an interface and communication between an RN and a core network in accordance with an embodiment of the present invention.

FIG. 4 is a flowchart illustrating a first method for establishing an interface and communication between an RN and a core network in accordance with an embodiment of the present invention. Following is detailed description of FIG. 4.

In block 401, a DeNB informs an RN of an identification and an IP address of a connectable MME.

In order to make the RN select a proper MME for a UE performing initial access, the DeNB may also send a relative capacity of an MME to the RN.

Similar with the block 301 in FIG. 3, the DeNB may inform the RN of the above information of all MME accessed by the DeNB. Alternatively, to reduce the load of the radio interface between the RN and the DeNB, the DeNB may inform the RN of the above information of an MME accessed by the DeNB and supporting RN or mobile RN, or the above information of an MME accessed by the DeNB and in an MME pool configured for a mobile RN.

It should be noted that if the connectable MME whose IP address is sent to the RN is an MME connected with the DeNB and supporting RN or mobile RN, the MME needs to inform the DeNB of whether the MME supports RN or mobile RN before the procedure in this block. In an embodiment, an MME may inform the DeNB of whether the MME supports RN or mobile RN when the DeNB is establishing an S1 with the MME.

If the connectable MME whose IP address is sent to the RN is an MME connected with the DeNB and in an MME pool configured for a mobile RN, the MME needs to inform the DeNB of whether the MME is in the MME pool configured for a mobile RN before the procedure in this block. In an embodiment, an MME may inform the DeNB of whether the MME is in the MME pool via an S1 establish response sent when the DeNB is establishing an S1 with the MME or via other procedures.

The RN may select an MME for a UE accessing the RN based on the MME identifications, and implements NNSF functions. For a UE performing initial access, the RN may select an MME for the UE based on the relative capacities of the MMES. If the RN needs to send a UE S1 message to the MME subsequently, the RN may set the IP address of the MME in the destination address in the protocol layer of the S1 message. After receiving the message, the DeNB forwards the S1 message to the MME according to the destination IP address.

In block 402, the DeNB sends the information of the RN to the connectable MME in block 401. The information of the RN may include an identification and an IP address of the RN.

To further support paging with a mobile RN, the information of the RN sent by the DeNB to the MME may also include a list of TAIs supported by the RN and a default cyclic non-consecutive receiving parameter.

When the DeNB sends the above information to the MME, the information of the RN in this block is sent to those MME whose information has been sent to the RN in block 401.

In an embodiment, if the information sent in block 401 is information of all MMES accessed by the DeNB, the information of the RN is sent to all the MMEs accessed by the DeNB in this block; if the information sent in block 401 is information of an MME accessed by the DeNB and supporting RN or mobile RN, the information of the RN is sent to the MME accessed by the DeNB and supporting RN or mobile RN in this block; if the information sent in block 401 is information of an MME accessed by the DeNB and in an MME pool configured for a mobile RN, the information of the RN is sent to the MME accessed by the DeNB and in the MME pool configured for a mobile RN in this block.

The identification of the RN, the list of TAIs supported by the RN and the default cyclic non-consecutive receiving parameter may be used for paging when mobile RN is supported, and the MME may send the list of TAIs supported by the RN to a UE accessing the RN. Therefore, when the UE is relatively static against the RN, the UE does not have to initiate an uplink TAU process. The MME may page a UE by using the list of TAIs sent to the UE.

A target MME may store the above information of the RN received.

In block 403, the RN and the MME transmit S1 signaling to each other by using the information obtained from the DeNB.

If the RN needs to send a UE S1 message to the MME subsequently, the RN may set the IP address of the MME in a protocol layer destination address in a message bearing the S1 message. After receiving the message, the DeNB forwards the S1 message to the MME according to the destination IP address.

If the MME needs to send a UE S1 message to a serving RN subsequently, the MME may set the protocol layer destination address in a message bearing the S1 message to be the IP address to enable the DeNB to transparently transmit the S1 message of the UE to the RN.

It should be noted that the protocol of the message bearing the S1 message may be stream control transmission protocol (SCTP) and IP.

The S1 signaling between the RN and the MME may be mapped to the user plane EPS bearer of the RN.

Hence, the process of a second method for establishing an interface and communication between an RN and a core network in accordance with an embodiment of the present invention is completed. Through the above process, the RN and the MME may directly obtain the IP address and an identification of each other from the DeNB, and perform communication by using the IP address and the identification. Then, the RN may select an MME for a UE. During communication between the RN and the MME, the base station transparently transmits S1 messages between the RN and the MME.

Detailed implementations of the above two methods are described by reference to a few examples.

Example 1

Figure 5:
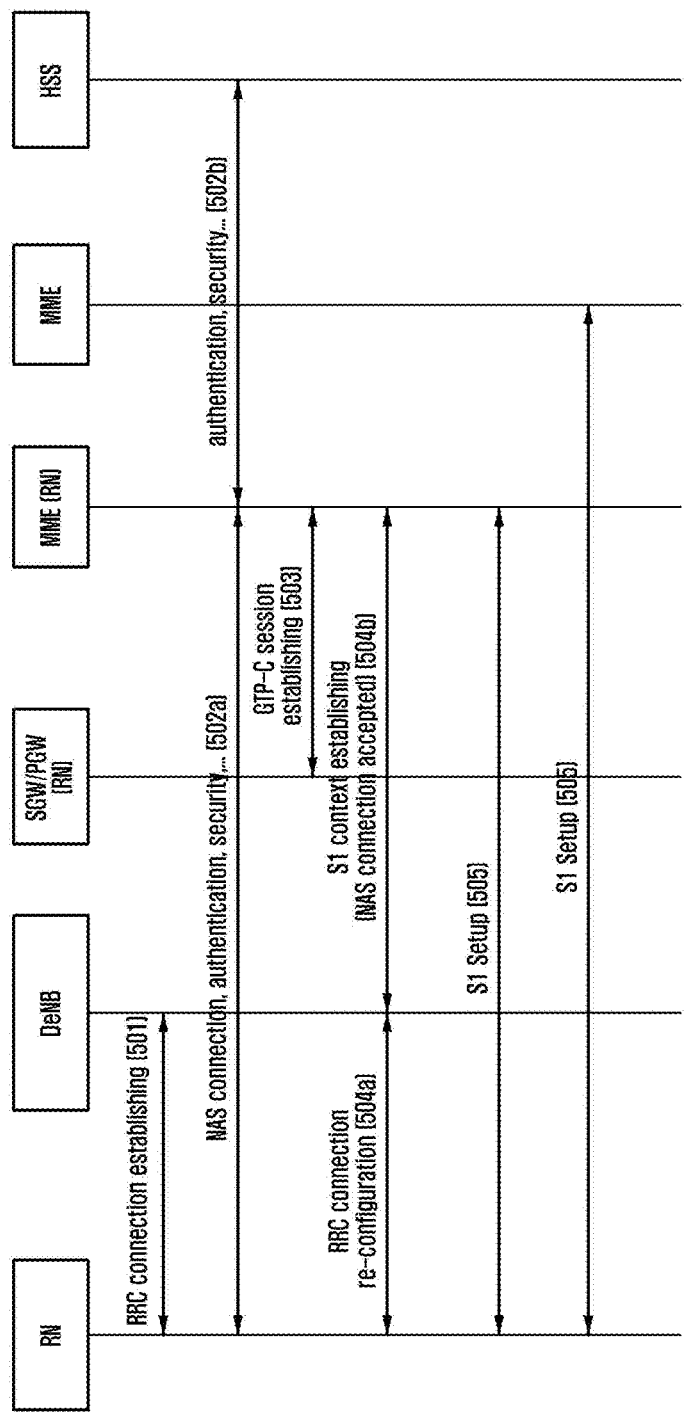
FIG. 5 is a flowchart illustrating the detailed process in accordance of embodiment one of the present invention.

FIG. 5 is a flowchart illustrating a process of an RN obtaining an IP address of a connectable MME and initiates an S1 establish process during RN attach procedure in accordance with example 1. It should be noted that in the methods of the present invention, the SGW/PGW of the RN may be standalone entities, or reside in the DeNB or other entities, and is not limited in the present invention because it is not important. The following is a description of FIG. 5. Procedures irrelevant to the present invention are neglected.

Before a cell of a DeNB selected by the RN is connected to the network, the DeNB has established an S1 connection with an MME in the MME pool. When the DeNB is establishing an S1 interface with the MME, the DeNB gets knowledge about whether an MME supports RN from an S1 establish response.

In block 501, the RN sends an RRC connection request to the DeNB. The DeNB sends an RRC connection establish message to the RN. The RN sends an RRC connection establish complete message to the DeNB. The message may include information indicating the connection establish information is from the RN.

In block 502, an NAS attach from the RN to the network is performed and authentications are performed. An EPC checks whether the RN has passed the authentications, and accepts the attach process only in response to a determination that the RN has passed the authentication. Otherwise, the EPC rejects the attach process. It should be noted that the DeNB may select an MME supporting RN for a UE, the MME serving the RN is MME(RN).

In block 503, a GTP-C session is established for the RN.

In block 504, the MME(RN) sends S1 context establish request to the DeNB. The message may include an NAS connection accepted message. The DeNB sends an RRC connection re-configure message to the RN. The message may include the NAS connection accepted message. The DeNB sets an MME IP address in the message according to information indicating that the downlink node is the RN. The MME IP address may be the IP address of an MME accessed by the DeNB, or the IP address of an MME supporting RN or mobile RN, or the IP address of an MME in an MME pool configured for a mobile RN.

The RN stores the received information. The RN sends an RRC connection re-configure complete message to the DeNB.

The DeNB sends an S1 context establish response to the MME(RN).

In block 505, an S1 establish process with the MME is initiated according to the IP address of the MME received in block 504. The detailed process is the same with that in block 302, thus will not be described further.

Example Two

Figure 6:
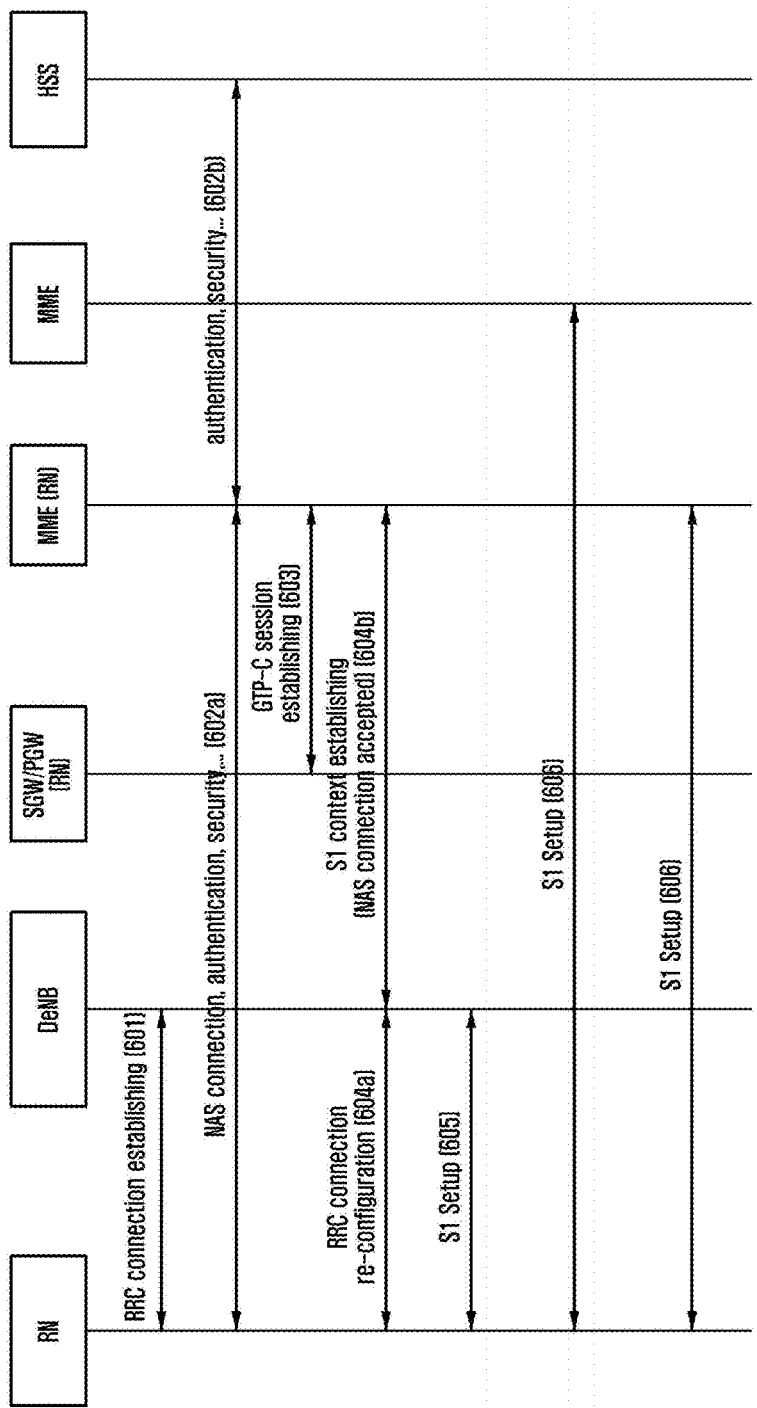
FIG. 6 is a flowchart illustrating the detailed process in accordance of embodiment two of the present invention.

FIG. 6 is a flowchart illustrating a process of an RN obtaining an IP address of a connectable MME and initiates an S1 establish process during RN attach procedure in accordance with example 2. It should be noted that in the methods of the present invention, the SGW/PGW of the RN may be standalone entities, or reside in the DeNB or other entities, and is not limited in the present invention because it is not important. In example 2, the RN is regarded as a base station from the perspective of the MME. All non-UE S1 processes are ended by the DeNB, and processed within the DeNB and the MME and within the RN and the DeNB. All UE-related S1 signaling is transparently transported between the RN and the MME and the DeNB.

The following is a description of FIG. 6. Procedures irrelevant to the present invention are neglected.

Before a cell of a DeNB selected by the RN is connected to the network, the DeNB has established an S1 connection with an MME in the MME pool. When the DeNB is establishing an S1 interface with the MME, the DeNB gets knowledge about whether an MME supports RN from an S1 establish response.

Procedures in blocks 601 to 603 are the same with those in blocks 501 to 503, and will not be described further.

In block 604, the MME(RN) sends an S1 context establish request to the DeNB. The message may include an NAS connection accepted message. The DeNB sends an RRC connection re-configure message to the RN. The message may include an NAS connection accepted message.

The RN sends an RRC connection re-configure complete message to the DeNB.

The DeNB sends an S1 context establish response to the MME(RN).

In block 605, the RN sends an S1 establish request to the DeNB. The DeNB obtains information that the message is received from the RN (e.g. obtains information that the DeNB is connected with the RN in block 601), and the DeNB sends an S1 establish response to the RN. The S1 establish response may include information of the MME. The information of the MME may include the IP address of the MME.

The IP address of the MME may be the IP address of an MME accessed by the DeNB, or the IP address of an MME supporting RN or mobile RN, or the IP address of an MME in an MME pool configured for a mobile RN.

The RN stores the received information.

In block 606, an S1 establish process with the MME is initiated according to the IP address of the MME received in block 605. The detailed process is the same with that in block 302, thus will not be described further.

The above examples 1 and 2 are exemplary implementations of the first method for establishing an interface and communication between the RN and the core network of the present invention. The differences between the two examples lie in that in example 1, the DeNB sends the information of the MME to the RN via an RRC connection re-configure message, and the RN initiates the S1 interface establish process; while in example 2, the DeNB sends the information of the MME to the RN via an S1 establish response message sent in an S1 interface establish process with the RN, and the RN initiates the S1 interface establish process. In the above two manners, manner one does not require the RN and the DeNB support the S1 procedures, and information are sent to the RN by using an RRC message sent during the process. Manner two may avoid modifications to RRC messages.

Example Three

Figure 7:
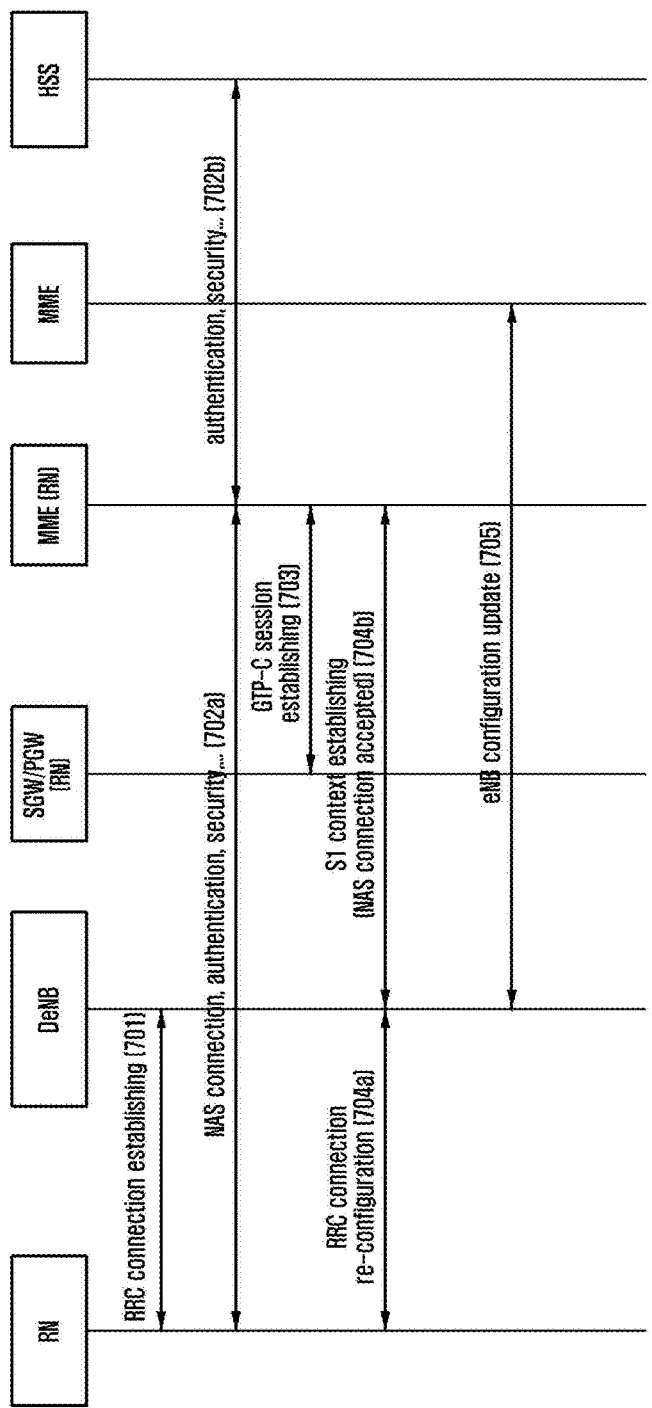
FIG. 7 is a flowchart illustrating the detailed process in accordance of embodiment three of the present invention.

FIG. 7 is a flowchart illustrating a process of an RN obtaining information of a connectable MME when the RN starts up and/or a process of an MME obtains information of an RN accessing the MME in accordance with example 3. It should be noted that in the methods of the present invention, the SGW/PGW of the RN may be standalone entities, or reside in the DeNB or other entities, and is not limited in the present invention because it is not important. The following is a description of FIG. 7. Procedures irrelevant to the present invention are neglected.

Before a cell of a DeNB selected by the RN is connected to the network, the DeNB has established an S1 connection with an MME in the MME pool. When the DeNB is establishing an S1 interface with the MME, the DeNB gets knowledge about whether an MME supports RN from an S1 establish response.

Procedures in blocks 701 to 703 are the same with those in blocks 501 to 503, and will not be described further.

In block 704, the MME(RN) sends an S1 context establish request to the DeNB. The message may include an NAS connection accepted message. The DeNB sends an RRC connection re-configure message to the RN. The message may include an NAS connection accepted message. The DeNB sets the information of the MME in the message according to information indicating that the downlink node is the RN. The information of the MME may be the information of an MME accessed by the DeNB, or the information of an MME supporting RN or mobile RN, or the information of an MME in an MME pool configured for a mobile RN. The MME information may include a list of MME identifications, the IP address of an MME, a relative capacity of an MME, and information indicating whether an MME supports mobile RN.

The RN stores the received information. The manner of the RN utilizing the above received information is the same with that in the method shown in FIG. 4, and will not be described further. The RN sends an RRC connection re-configure complete message to the DeNB.

The DeNB sends an S1 context establish response to the MME(RN). The DeNB obtains information that it is an RN that performs accessing not a UE in block 701, and may set information of the RN in the S1 context establish response message. The information of the RN may include an identification of the RN, an IP address of the RN, a list of TAIs supported by the RN, and a default cyclic non-consecutive receiving parameter. The manner of the MIME utilizing the above received information is the same with that in the method shown in FIG. 4, and will not be described further.

In block 705, the DeNB sends an eNB configuration update message to the MME which may include an MME supporting RN or mobile RN in an MME pool and connected with the DeNB, or an MME connected with the DeNB in the MME pool configured for a mobile RN.

Since the DeNB has sent the information of the RN to the MME(RN) via the S1 context establish response message in block 704, in this block, the DeNB may send or not send the eNB configuration update message to the MME serving the RN (i.e. MME(RN)).

The eNB configuration update message sent by the DeNB may include the information of the RN. The information of the RN may include an identification of the RN, an IP address of the RN, a list of TAIs supported by the RN, and a default cyclic non-consecutive receiving parameter. The manner of the MME utilizing the above received information is the same with that in the method shown in FIG. 4, and will not be described further. The MME may send an eNB configuration update acknowledgement to the RN.

Example 4

Figure 8:
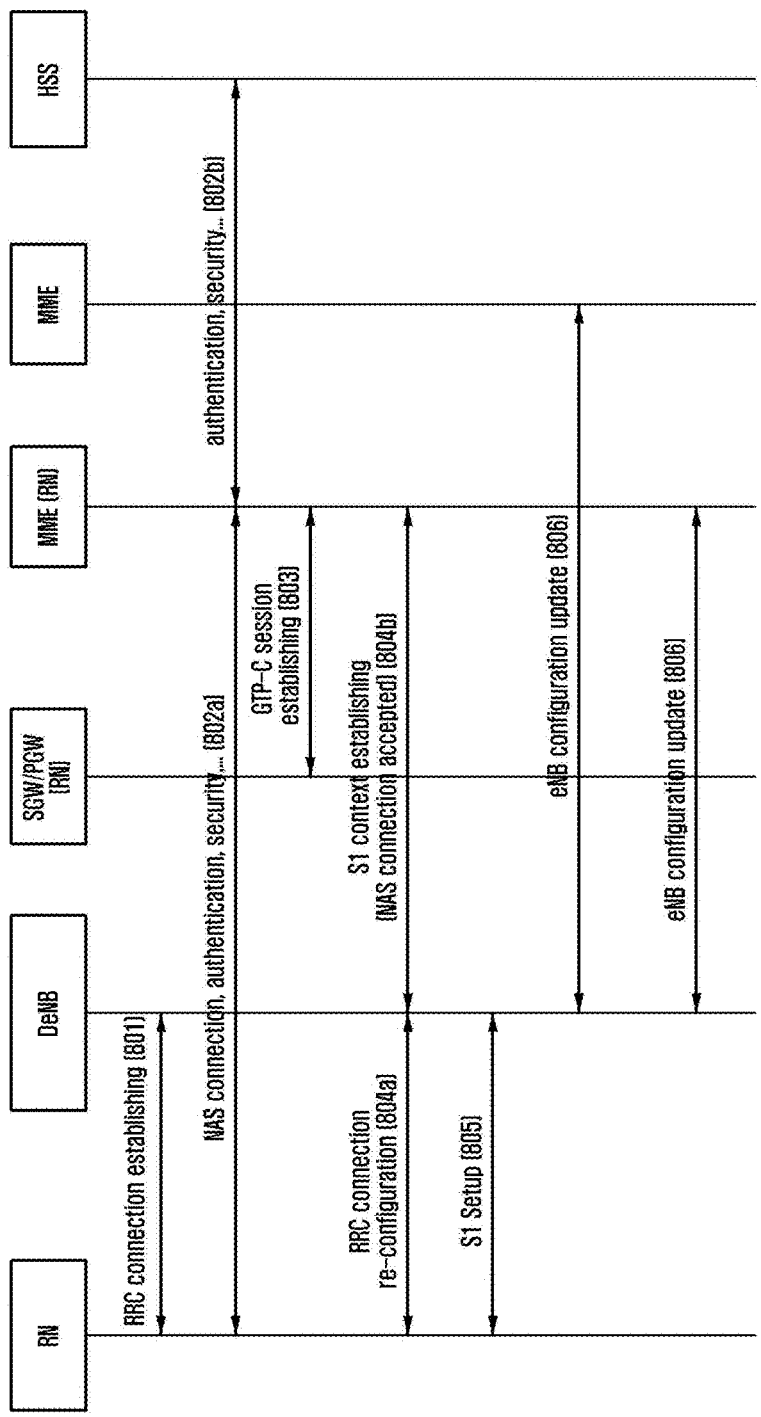
FIG. 8 is a flowchart illustrating the detailed process in accordance of embodiment four of the present invention.

FIG. 8 is a flowchart illustrating a process of an RN obtaining information of a connectable MME when the RN starts up and/or a process of an MME obtains information of an RN accessing the MME in accordance with example 4. It should be noted that in the methods of the present invention, the SGW/PGW of the RN may be standalone entities, or reside in the DeNB or other entities, and is not limited in the present invention because it is not important. The following is a description of FIG. 8. Procedures irrelevant to the present invention are neglected.

Before a cell of a DeNB selected by the RN is connected to the network, the DeNB has established an S1 connection with an MME in the MME pool. When the DeNB is establishing an S1 interface with the MME, the DeNB gets knowledge about whether an MME supports RN from an S1 establish response.

Procedures in blocks 801 to 804 are the same with those in blocks 601 to 604, and will not be described further.

In block 805, the RN sends an S1 establish request to the DeNB. The DeNB obtains information that the message is received from the RN (e.g. obtains information that the DeNB is connected with the RN in block 801), and the DeNB sends an S1 establish response to the RN. The S1 establish response may include information of the MME. The MME information may include a list of MME identifications, the IP address of an MME, a relative capacity of an MME, and information indicating whether an MME supports mobile RN.

The RN stores the received information. The manner of the RN utilizing the above received information is the same with that in the method shown in FIG. 4, and will not be described further.

The information of the MME may be the information of an MME accessed by the DeNB, or the information of an MME supporting RN or mobile RN and accessed by the DeNB, or the information of an MME connected with the DeNB in an MME pool configured for a mobile RN.

In block 806, the DeNB sends an eNB configuration update message to the MME which may include an MME supporting RN or mobile RN in an MME pool and connected with the DeNB, or an MME connected with the DeNB in the MME pool configured for a mobile RN.

The eNB configuration update message may include information of the RN. The information of the RN may include an identification of the RN, an IP address of the RN, a list of TAIs supported by the RN, and a default cyclic non-consecutive receiving parameter. The manner of the MME utilizing the above received information is the same with that in the method shown in FIG. 4, and will not be described further. The MME may send an eNB configuration update acknowledgement to the RN.

The above examples 3 and 4 are exemplary implementations of the second method for establishing an interface and communication between the RN and the core network of the present invention. Differences between the two example lie in that in example 1, the DeNB sends the information of the MME to the RN via an RRC connection re-configure message, and sends the information of the RN to the MME(RN) via a context establish response message sent to the MME(RN), and sends the information of the RN to other MMEs via an eNB configuration update message sent to the other MMEs; while in example 2, the DeNB sends the information of the MME to the RN via an S1 establish response message during an S1 interface establish process with the RN, and sends the information of the RN to a connectable MME via an eNB configuration update message sent to the MME. In the above two manners, manner one does not require the RN and the DeNB support the S1 procedures, and information are sent to the RN by using an RRC message sent during the process. Manner two may avoid modifications to RRC messages.

Example 5

Figure 9:
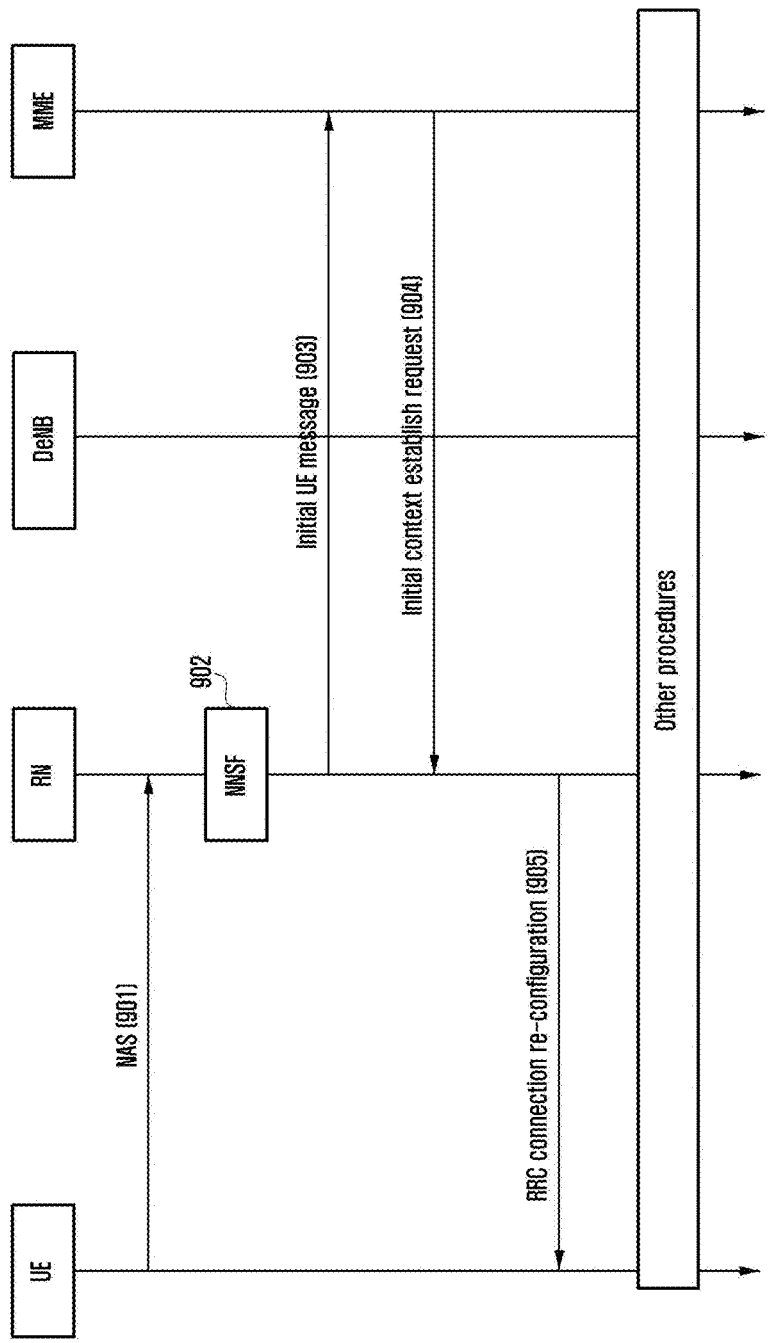
FIG. 9 is a flowchart illustrating a process of a UE accesses a network via an RN cell.

FIG. 9 is a flowchart illustrating a UE accessing a network via an RN cell. The following is a description of FIG. 9. Procedures irrelevant to the present invention are neglected.

In block 901, a UE sends an NAS message to an RN, e.g. an Attach message or an TA update request, and so on. In this block, the UE may send an uplink NAS message to the RN via uplink information transmission or an RRC connection establish complete message.

In block 902, according to the manner 1 or manner 2, or any method of examples 1 to 4, the RN obtains information of a connectable MME, selects an MME for the UE to access, or identifies a proper MME based on S-TMSI in a received RRC message or information of registered MMEs.

In block 903, the RN sends an S1 AP initial UE message to the MME. The message may include the NAS message received from the UE. A protocol layer destination address in a message bearing the initial UE message may include the IP address of the MME. A source address may be the IP address of the RN. The DeNB sends the initial UE message to the corresponding MME according to the destination IP address without parsing the S1 message.

In block 904, the MME sends a context establish request to the RN. A protocol layer destination address in a message bearing the context establish message may include the IP address of the RN. A source address may be the IP address of the MME. The DeNB sends the initial UE message to the corresponding RN according to the destination IP address without parsing the S1 message.

In block 905, the RN sends an RRC connection re-configure message to the UE.

In block 906, the remaining process of the UE access is the same with the conventional process and only differs in that the S1 AP message of the UE is transparently transported via the DeNB as in block 903 and block 904, and the DeNB does not parse the S1 AP message. When sending the S1 AP message of the UE, the RN may load the IP address of the corresponding MME into a protocol layer destination address in a message bearing the S1 AP message according to the MME serving the UE and a relation which associates the identification of the MME with the IP address of the MME. When sending the S1 AP message of the UE, the MME may load the IP address of the corresponding RN into a protocol layer destination address in a message bearing the S1 AP message according to a relation which associates the identification of the RN with the IP address of the RN.

The above embodiments can reduce unnecessary signaling procedures and reduce complexity, mitigate network congestions and support multiple access techniques in high-speed moving scenarios.

The purpose, technical solution and merits of this invention have been further described in detail by the above preferred embodiments. It should be appreciated that the foregoing is only preferred embodiments of this invention and is not for use in limiting the invention. Any modification, equivalent substitution, improvement within the spirit and principle of the invention should be covered in the protection scope of the invention.

What is claimed is:

1. A method for operating a relay node (RN) in a wireless communication system, the method comprising:

transmitting, to a base station, a first message used to establish a radio resource control (RRC) connection between the RN and the base station, the first message including an attach request and information indicating that the RRC connection is for a mobile RN, wherein the base station is connected to a network entity supporting the mobile RN;

receiving, from the base station, a second message including an accept of the attach request with the network entity, the second message further including an IP address of the network entity; and establishing an interface with the network entity based on the IP address of the network entity included in the second message, wherein the IP address of the network entity is used as a destination address of a request message for establishing the interface.

2. The method of claim 1, wherein the second message is used to reconfigure the RRC connection between the RN and the base station.

3. The method of claim 1, wherein the information is transmitted to the network entity by the base station.

4. A relay node (RN) in a wireless communication system, the RN comprising:
   a transceiver configured to transmit and receive a signal; and
   a controller coupled with the transceiver and configured to:
   transmit, to a base station, a first message used to establish a radio resource control (RRC) connection between the RN and the base station, the first message including an attach request and information indicating that the RRC connection is for a mobile RN, wherein the base station is connected to a network entity supporting the mobile RN,
   receive, from the base station, a second message including an accept of the attach request with the network entity, the second message further including an IP address of the network entity, and
   establish an interface with the network entity based on the IP address of the network entity included in the second message, wherein the IP address of the network entity is used as a destination address of a request message for establishing the interface.

5. The RN of claim 4, wherein the second message is used to reconfigure the RRC connection between the RN and the base station.

6. The RN of claim 4, wherein the information is transmitted to the network entity by the base station.

7. A method by a base station in a wireless communication system, the method comprising:
   receiving, from a relay node (RN), a first message used to establish a radio resource control (RRC) connection between the RN and the base station, the first message including an attach request and information indicating that the RRC connection is for a mobile RN, wherein the base station is connected to a network entity supporting the mobile RN; and transmitting, to the RN, a second message including an accept of the attach request with the network entity, the second message further including an IP address of the network entity, wherein an interface between the RN and the network entity is established based on the IP address of the network entity included in the second message, and wherein the IP address of the network entity is used as a destination address of a request message for establishing the interface.

8. The method of claim 7, wherein the second message is used to reconfigure the RRC connection between the RN and the base station.

9. The method of claim 7, wherein the method further comprises:
   transmitting, to the network entity, the information; and
   receiving, from the network entity, the accept of the attach request.

10. A base station in a wireless communication system, the base station comprising:
    a transceiver configured to transmit and receive a signal; and
    a controller coupled with the transceiver and configured to:
    receive, from a relay node (RN), a first message used to establish a radio resource control (RRC) connection between the RN and the base station, the first message including an attach request and information indicating that the RRC connection is for a mobile RN, wherein the base station is connected to a network entity supporting the mobile RN, and
    transmit, to the RN, a second message including an accept of the attach request with the network entity, the second message further including an IP address of the network entity,
    wherein an interface between the RN and the network entity is established based on the IP address of the network entity included in the second message, and
    wherein the IP address of the network entity is used as a destination address of a request message for establishing the interface.

11. The base station of claim 10, wherein the second message is used to reconfigure the RRC connection between the RN and the base station.

12. The base station of claim 10, wherein the controller is further configured to:
    transmit, to the network entity, the information; and
    receive, from the network entity, the accept of the attach request.

* * * * *